United States Patent
Hummel et al.

(10) Patent No.: US 10,104,907 B2
(45) Date of Patent: *Oct. 23, 2018

(54) HIGHLY COHESIVE COMPOSITE POLYMER MATERIALS, PREPARATION THEREOF AND, E.G., CIGARETTE FILTERS COMPRISING SAME

(75) Inventors: Andreas Hummel, Freiburg (DE); Carsten Habeck, Freiburg (DE); Jean-Francois Viot, Irigny (FR); Philippe Lapersonne, Münstertal (DE)

(73) Assignee: Rhodia Acetow GmbH, Freiburg (DE)

( * ) Notice: Subject to any disclaimer, the term of this patent is extended or adjusted under 35 U.S.C. 154(b) by 523 days.

This patent is subject to a terminal disclaimer.

(21) Appl. No.: 12/921,859

(22) PCT Filed: Mar. 16, 2009

(86) PCT No.: PCT/EP2009/053090
§ 371 (c)(1),
(2), (4) Date: Sep. 10, 2010

(87) PCT Pub. No.: WO2009/112591
PCT Pub. Date: Sep. 17, 2009

(65) Prior Publication Data
US 2011/0011414 A1 Jan. 20, 2011

(30) Foreign Application Priority Data

Mar. 14, 2008 (FR) ..................... 08 01423

(51) Int. Cl.
| | | |
|---|---|---|
| *B01D 53/02* | (2006.01) | |
| *A24D 3/14* | (2006.01) | |
| *A24D 3/16* | (2006.01) | |
| *B01J 20/02* | (2006.01) | |
| *B01J 20/06* | (2006.01) | |
| *B01J 20/08* | (2006.01) | |
| *B01J 20/10* | (2006.01) | |
| *B01J 20/16* | (2006.01) | |
| *B01J 20/20* | (2006.01) | |
| *B01J 20/26* | (2006.01) | |
| *B01J 20/28* | (2006.01) | |

(52) U.S. Cl.
CPC ............... *A24D 3/14* (2013.01); *A24D 3/16* (2013.01); *B01D 53/02* (2013.01); *B01J 20/0207* (2013.01); *B01J 20/0211* (2013.01); *B01J 20/0229* (2013.01); *B01J 20/06* (2013.01); *B01J 20/08* (2013.01); *B01J 20/103* (2013.01); *B01J 20/16* (2013.01); *B01J 20/20* (2013.01); *B01J 20/26* (2013.01); *B01J 20/28004* (2013.01); *B01J 20/28011* (2013.01); *B01J 20/28019* (2013.01); *B01J 20/28026* (2013.01); *B01J 20/28057* (2013.01); *B01J 20/28061* (2013.01); *B01J 20/28064* (2013.01); *B01J 20/28069* (2013.01); *B01J 20/28078* (2013.01); *B01D 2253/102* (2013.01); *B01D 2253/106* (2013.01); *B01D 2253/1124* (2013.01); *B01D 2253/202* (2013.01); *B01D 2253/304* (2013.01); *B01D 2253/311* (2013.01); *B01D 2257/708* (2013.01); *B01J 2220/42* (2013.01); *B01J 2220/46* (2013.01); *B01J 2220/66* (2013.01)

(58) Field of Classification Search
CPC ...... B01J 20/0251; B01J 20/10; B01J 20/103; B01J 20/20; B01J 20/205; B01J 20/2803; B01J 20/283; B01J 20/3042
See application file for complete search history.

(56) References Cited

U.S. PATENT DOCUMENTS

| | | | |
|---|---|---|---|
| 4,081,402 A | | 3/1978 | Levy et al. |
| 4,548,646 A | * | 10/1985 | Mosser et al. ............. 106/14.12 |
| 4,637,990 A | * | 1/1987 | Torobin ..................... 502/10 |
| 2005/0047985 A1 | * | 3/2005 | Mori et al. ................. 423/335 |
| 2010/0043813 A1 | | 2/2010 | Eberhardt et al. |

FOREIGN PATENT DOCUMENTS

| | | |
|---|---|---|
| FR | 2239282 | 2/1975 |
| FR | 2905628 A1 | 3/2008 |
| GB | 1045694 | 10/1966 |
| JP | 05339410 | 12/1993 |
| WO | WO 02/04115 A1 | 1/2002 |
| WO | WO 2008/031816 A2 | 3/2008 |

OTHER PUBLICATIONS

Lapcik et al., "Process for Preparing Filters Based on Crushed Polyurethane Material", May 14, 2003 (Abstract Only).

* cited by examiner

*Primary Examiner* — Michael J Felton
(74) *Attorney, Agent, or Firm* — Michael Best & Friedrich LLP

(57) ABSTRACT

Highly cohesive composite materials, formed of at least one polymer and at least one compound selected from among the mineral oxides, silicoaluminates and activated carbon, have:
a number median particle size of at least 150 μm;
a pore volume (Vd1), constituted of pores of diameter ranging from 3.6 to 1000 nm, of at least 0.4 cm³/g; and
a cohesion index $CI_N$, equal to the ratio (number median particle size after an air pressure stress of 4 bar)/(number median particle size without air pressure stress (0 bar)), greater than 0.40. Such composite materials are useful, e.g., as liquid supports, catalyst supports, additives or for liquid or gas filtration, in particular in cigarette filters.

29 Claims, No Drawings

HIGHLY COHESIVE COMPOSITE POLYMER MATERIALS, PREPARATION THEREOF AND, E.G., CIGARETTE FILTERS COMPRISING SAME

CROSS-REFERENCE TO PRIORITY/PCT APPLICATIONS

This application is a National Stage of PCT/EP 2009/053090, filed Mar. 16, 2009 and designating the United States (published in the English language on Sep. 17, 2009, as WO 2009/112591 A2), which claims priority of FR 0801423, filed Mar. 14, 2008, each hereby expressly incorporated by reference in its entirety and each assigned to the assignee hereof.

The present invention relates to highly cohesive materials and to a method for preparing highly cohesive materials.

It also relates to their uses, in particular as a liquid support, a catalyst support, an additive or for liquid or gas filtration; it relates more particularly to their use in cigarette filters.

It is known to condition liquids on solid supports, in particular on a silica support.

It is also known to use a compound such as activated carbon for its adsorption properties, especially for liquid or gas filtration, in particular in cigarette filters.

One of the aims of the invention is to provide a new material having a high cohesion and which preferably produces little or no dust, which may possibly be used satisfactorily as a liquid support or for gas or liquid filtration, in particular in cigarette filters, especially as an active filter, preferably by substitution of the activated carbon and/or in addition to the conventionally used filter, such as cellulose acetate.

Thus, one subject of the invention is a composite material, characterized in that it is made up of at least one polymer (P) and of at least one compound (C) chosen from mineral oxides, silicoaluminates and activated carbon, and in that it has:
- a number median particle size ($D_{50n(o)}$) of at least 150 μm, and preferably of at most 2000 μm,
- a pore volume (Vd1), constituted of pores of diameter between 3.6 and 1000 nm, of at least 0.4 cm$^3$/g, and
- a cohesion such that its cohesion index $CI_N$, equal to the ratio (number median particle size after an air pressure stress of 4 bar)/(number median particle size without air pressure stress (0 bar)), according to the test described below, is greater than 0.40.

The polymer (P) is advantageously a porous polymer.

The polymer (P) is in general chosen from the following polymers: cellulose and its derivatives (in particular cellulose acetate), starch and its derivatives, alginates and their derivatives, polyethylene, guars and their derivatives, polyvinyl alcohols and their derivatives.

The polymer (P) may be, for example, one of the polymers below: cellulose, cellulose acetate, cellulose sulphate, ethyl cellulose, hydroxyethyl cellulose, methyl cellulose, hydroxymethyl cellulose, carboxymethyl cellulose, starch, carboxymethylated starch, hydroxypropyl starch, gum arabic, agar, alginic acid, sodium alginate, potassium alginate, calcium alginate, gum tragacanth, guar gum, carob bean gum, polyvinyl acetates (possibly hydrolysed), copolymers of polyvinyl acetates and vinyl esters of aliphatic carboxylic acids, polyvinyl alcohols, polyethylene, copolymers of ethylene and vinyl esters of saturated aliphatic carboxylic acids, hydrated polycyclopentadiene.

In particular, the polymer (P) may be cellulose or one of its derivatives (amongst others, cellulose acetate or cellulose sulphate), polyethylene, gum arabic or a polyvinyl alcohol.

More particularly, the polymer (P) may be a derivative of cellulose (for example, cellulose acetate, cellulose sulphate, ethyl cellulose, hydroxyethyl cellulose, methyl cellulose, hydroxymethyl cellulose, carboxymethyl cellulose).

Most preferably, the polymer (P) is cellulose acetate.

The compound (C) is most often an adsorbent and/or a catalyst support.

The compound (C) may be a mineral oxide, such as, in particular, a silica, an alumina, a zirconium oxide, a titanium oxide, an iron oxide or a cerium oxide.

The compound (C) may also be an aluminosilicate.

Finally, the compound (C) may be activated carbon (in particular, coconut activated carbon).

Thus, the compound (C) is generally chosen from silicas, aluminas, zirconium oxides, titanium oxides, iron oxides, cerium oxides, aluminosilicates and activated carbon.

The compound (C) consists, for example, of a synthetic amorphous silica.

This may be a fumed silica, a colloidal silica, a silica gel, a precipitated silica or one of their mixtures.

According to one preferred variant of the invention, the compound (C) is precipitated silica.

According to another preferred variant of the invention, the compound (C) is activated carbon.

The composite material may contain, according to one embodiment of the invention, a mixture of compounds (C), in particular a mixture of precipitated silica and activated carbon.

The composite material conforming to the invention may be made solely of at least one polymer (P) and at least one compound (C).

The cohesion is measured by the following cohesion test.

A MALVERN MASTERSIZER 2000 laser particle size analyser (from Malvern Instruments) is used coupled to the Scirocco dry mode sampling unit. The analysis is carried out using the Fraunhofer optical model, with a measurement time of 5 seconds.

A first analysis is carried out by introducing the product solely by the vibration of the hopper and aspiration, in order to have access to an initial size of the product. This initial size of the product corresponds to its number median particle size ($D_{50n(0)}$), referred to as the number median particle size without air pressure stress (0 bar).

A second analysis is carried out by injecting, via the nozzle of the sampling unit, an air pressure of 4 bar. This pressure value has been defined for granules made up solely of activated carbon, the activated carbon being a product already used in cigarette filters; it generates a sufficient stress to start the attrition of the activated carbon. This stress level thus corresponds to the appearance of fine particles in the case of activated carbon alone; it is used as a reference value for positioning the composite materials according to the invention.

The level of attrition undergone by the product is evaluated by comparison between, on the one hand, the particle size distribution measured without air pressure stress (0 bar) and, on the other hand, the particle size distribution measured after an air pressure stress of 4 bar. More particularly, the indicator used for the particle size distribution is the number median size ($D_{50n}$).

After the number median particle size without air pressure stress (0 bar), referred to as $D_{50n(0)}$, the number median particle size after an air pressure stress of 4 bar, referred to as $D_{50n(4)}$, is measured.

The cohesion index $CI_N$, equal to the ratio $D_{50n(4)}/D_{50n(0)}$ (that is to say (number median particle size after an air pressure stress of 4 bar)/(number median particle size without air pressure stress (0 bar)), is calculated; it makes it possible to quantify the resistance to attrition exhibited by the product, that is to say its cohesion: the higher the cohesion index $CI_N$, the better the product withstands attrition, that is to say the more cohesive the product.

The cohesion of the composite materials according to the invention expresses, in particular, their ability to resist a level of stress without forming, in a significant amount, and advantageously without forming at all, fine particles which, in particular, may possibly be inhaled by the smoker when these materials are used in cigarette filters.

The pore volumes and diameters of the pores are measured by mercury porosimetry (Micromeritics Autopore 9520 porosimeter, for example); for these measurements, the preparation of each sample may be carried out as follows: each sample is first dried for 2 hours at 90° C., under atmospheric pressure, then placed in a test vessel in the 5 minutes following this drying and degassed under vacuum, for example using a vacuum pump; the sample sizes are 0.22 g (±0.01 g); the No. 10 penetrometers are used. The pore diameters are calculated by Washburn's equation with a contact angle $\theta=140°$ and a surface tension $\gamma$ equal to 484 dynes/cm. In the present text, pores having a diameter between 3.6 and 1000 nm are not taken into account.

The composite material according to the invention has a number median particle size ($D_{50n(0)}$) of at least 150 µm, notably of at least 250 µm. Preferably, this is at most 2000 µm. It may be between 150 and 1000 µm, in particular between 250 and 1000 µm, for example between 250 and 900 µm.

In general, it has a number median particle size greater than 250 µm (especially varying from 250 (exclusive) to 2000 µm, even to 1000 µm), preferably of at least 400 µm, especially between 400 and 2000 µm, in particular between 450 and 1200 µm.

Its number median particle size is in general between 450 and 1000 µm, in particular between 500 and 1000 µm, especially between 540 and 900 µm, for example between 540 and 800 µm.

The composite material in accordance with the invention may have, for example when it is intended to be used in a cigarette filter, particle sizes between 150 and 2000 µm, notably between 250 and 1500 µm, in particular between 400 and 800 µm, even between 500 and 800 µm.

The composite material according to the invention is, advantageously, porous.

It has an intra-particle pore volume (Vd1), consisted of pores of diameter between 3.6 and 1000 nm (that is to say a pore volume accumulated from pores of diameter between 3.6 and 1000 nm), of at least 0.4 cm³/g, and usually at most 3.0 cm³/g (cm³ per gram of composite material).

Its pore volume (Vd1) is, in general, of at least 0.5 cm³/g, in particular between 0.5 and 3.0 cm³/g, for example between 0.5 and 2.5 cm³/g, even between 0.5 and 2.0 cm³/g. Notably in the case where the compound (C) is silica (preferably precipitated silica), the pore volume (Vd1) of the composite material according to the invention may be of at least 0.6 cm³/g, in particular between 0.6 and 3.0 cm³/g, preferably between 0.6 and 2.0 cm³/g, for example between 0.7 and 1.5 cm³/g, even between 0.7 and 1.4 cm³/g. Still more preferably, its pore volume (Vd1) is at least 0.8 cm³/g, in particular between 0.8 and 3.0 cm³/g, especially between 0.8 and 2.0 cm³/g, for example between 0.9 and 1.4 cm³/g.

The composite material according to the invention has a high cohesive strength.

It has a cohesion such that its cohesion index $CI_N$, equal to the ratio (number median particle size after an air pressure stress of 4 bar)/(number median particle size without air pressure stress (0 bar)), according to the test described above, is greater than 0.40, preferably greater than 0.50.

Its number median particle size after an air pressure stress of 4 bar ($D_{50n(4)}$), according to the cohesion test described above, is greater than 350 µm, in particular greater than 400 µm, for example greater than 500 µm.

Advantageously, more particularly when it is intended to be used in a cigarette filter, and for example, amongst others, when the compound (C) is silica (preferably precipitated silica) and/or activated carbon, its cohesion is such that its cohesion index $CI_N$, equal to the ratio (number median particle size after an air pressure stress of 4 bar)/(number median particle size without air pressure stress (0 bar)), according to the test described above, is greater than 0.60, preferably greater than 0.80, in particular greater than 0.85, for example greater than 0.90.

The composite material in accordance with the invention preferentially does not generate dust during its handling.

The composite material according to the present invention has, preferably, notably when it is used in a cigarette filter, a filterability close to, even greater than, that of the compound (C) incorporated in its composition, in particular when the compound (C) is activated carbon and/or silica (preferably precipitated silica), while having a better cohesion. This is even more the case when the polymer (P) is cellulose acetate.

The composite material conforming to the invention may have, especially when the compound (C) is silica, in particular precipitated silica, an average pore diameter, for the pores of diameter between 3.6 and 1000 nm, of at least 9 nm (for example between 9 and 100 nm or between 9 and 50 nm), preferably greater than 11 nm (for example, between 11 (exclusive) and 100 nm or between 11 (exclusive) and 50 nm), especially of at least 12 nm, for example between 12 and 100 nm; it may be between 12 and 50 nm, in particular between 12 and 25 nm or between 12 and 18 nm; it may also vary between 13 and 25 nm, for example between 13 and 18 nm.

The composite material according to the invention, which is advantageously in solid form, generally has a BET specific surface area of at least 50 m²/g. In general, its BET specific surface area is at most 1300 m²/g and in particular at most 1200 m²/g, especially at most 1000 m²/g, for example at most 900 m²/g, even at most 700 m²/g (m² per gram of composite material). It may be less than 400 m²/g.

The BET specific surface area is determined according to the Brunauer-Emmett-Teller method described in "The Journal of the American Chemical Society", vol. 60, page 309, February 1938 and corresponding to the standard NF ISO 9277 (December 1996).

The BET specific surface area of the composite material according to the present invention may be of at least 100 m²/g, in general at least 160 m²/g, preferably of at least 200 m²/g (for example at least 210 m²/g); it may be between 200 and 1300 m²/g, in particular between 200 and 1000 m²/g, for example between 200 and 800 m²/g, even between 200 and 700 m²/g or between 210 and 650 m²/g. Especially, in the case where the compound (C) is silica, in particular precipitated silica, the BET specific surface area of the composite material according to the invention may be between 200 and 600 m²/g, in particular between 200 and 500 m²/g; for example between 210 and 400 m²/g, or between 210 and 300 m²/g.

The specific surface area of the composite material in accordance with the invention is essentially a function of the specific surface area of the compound (C), its compound (C) content and the surface accessibility of the compound (C) within the composite material, permitted by the porosity of the polymer (P). Preferably, the composite material according to the invention retains a substantial part of the specific surface area of the compound (C), in particular when the polymer (P) is cellulose acetate, especially in the case where the compound (C) is activated carbon and/or especially silica (preferably precipitated silica).

According to one particular embodiment, more particularly when it is intended to be used in a cigarette filter, and for example, amongst others, when the compound (C) is silica (preferably precipitated silica) and/or activated carbon, the composite material conforming to the invention has a number median particle size ($D_{50n(0)}$) of at least 400 µm (and for example of at most 2000 µm), notably between 400 and 1000 µm, for example between 500 and 800 µm, a BET specific surface area of at least 200 m²/g (and for example at most 1000 m²/g), preferably between 200 and 800 m²/g, in particular between 200 and 600 m²/g, especially between 200 and 500 m²/g, for example between 200 and 400 m²/g, even between 210 and 400 m²/g or between 210 and 300 m²/g, and a cohesion such that its cohesion index $CI_N$, equal to the ratio (number median particle size after an air pressure stress of 4 bar, or $D_{50n(4)}$)/(number median particle size without air pressure stress (0 bar) or $D_{50n(0)}$), is greater than 0.60, in particular greater than 0.80, for example greater than 0.85.

In general, the composite material according to the invention has a polymer (P) content between 10 and 95%, preferably between 15 and 45%, by weight, and a compound (C) content between 5 and 90%, preferably between 55 and 85%, by weight.

The composite material according to the present invention may especially be in the form of extrudates, for example in cylindrical form, in spherical form, or, preferentially, in the form of granules.

It may contain, in addition to the polymer (P) and the compound (C), at least one aroma and/or at least one plasticizer.

Another subject of the invention is a method for preparing a composite material, in particular the composite material according to the invention, described in the preceding text, comprising the following successive steps:

1) at least one compound (C), chosen from mineral oxides, aluminosilicates and activated carbon, and one polymer (P) solution, are introduced into an extruder, the outlet of the extruder being equipped with a plate perforated with hole(s), said plate being located between the extruder and blades, the outlet of the extruder opening into a bath comprising a liquid that is a non-solvent for the polymer (P) and that is at least partly miscible with the solvent used in the polymer (P) solution, said blades being submerged in this bath;

2) after passing into the hole(s) of the perforated plate, the effluent (or extrudate) coming from the outlet of the extruder is cut, by said blades, in the form of drops (portions or segments of effluent (or of extrudate)), said drops precipitating in said bath to particles or elements (in particular granules) of composite material;

3) said particles (or granules) are separated from said bath;

4) said particles (or granules) are washed in order to eliminate, at least partially, the solvent used in the polymer (P) solution; and 5) said particles (or granules) are dried.

The polymer (P) used is, advantageously, a porous polymer.

The polymer (P) is in general chosen from the following polymers: cellulose and its derivatives (in particular cellulose acetate), starch and its derivatives, alginates and their derivatives, polyethylene, guars and their derivatives, polyvinyl alcohols and their derivatives.

The polymer (P) may be, for example, one of the polymers below: cellulose, cellulose acetate, cellulose sulphate, ethyl cellulose, hydroxyethyl cellulose, methyl cellulose, hydroxymethyl cellulose, carboxymethyl cellulose, starch, carboxymethylated starch, hydroxypropyl starch, gum arabic, agar, alginic acid, sodium alginate, potassium alginate, calcium alginate, gum tragacanth, guar gum, carob bean gum, polyvinyl acetates (possibly hydrolysed), copolymers of polyvinyl acetates and vinyl esters of aliphatic carboxylic acids, polyvinyl alcohols, polyethylene, copolymers of ethylene and vinyl esters of saturated aliphatic carboxylic acids, hydrated polycyclopentadiene.

In particular, the polymer (P) may be cellulose or one of its derivatives (amongst others, cellulose acetate or cellulose sulphate), polyethylene, gum arabic or a polyvinyl alcohol.

More particularly, the polymer (P) may be a derivative of cellulose (for example, cellulose acetate, cellulose sulphate, ethyl cellulose, hydroxyethyl cellulose, methyl cellulose, hydroxymethyl cellulose, carboxymethyl cellulose).

Most preferably, the polymer (P) is cellulose acetate.

The compound (C) used is most often an adsorbent and/or a catalyst support.

The compound (C) may be a mineral oxide, such as, in particular, a silica, an alumina, a zirconium oxide, a titanium oxide, an iron oxide or a cerium oxide.

The compound (C) may also be an aluminosilicate.

Finally, the compound (C) may be activated carbon (in particular, coconut activated carbon).

Thus, the compound (C) is generally chosen from silicas, aluminas, zirconium oxides, titanium oxides, iron oxides, cerium oxides, aluminosilicates and activated carbon.

The compound (C) consists, for example, of a synthetic amorphous silica.

This may be a fumed silica, a colloidal silica, a silica gel, a precipitated silica or one of their mixtures.

According to a preferred variant of the invention, the compound (C) is precipitated silica. This may be prepared by a reaction for precipitating a silicate, such as an alkali metal silicate (sodium silicate for example), with an acidifying agent (sulphuric acid for example) to produce a suspension of precipitated silica, then usually by separating, in particular by filtering (with production of a filter cake) the precipitated silica obtained, and finally drying (generally by spraydrying); any method may be used to prepare the precipitated silica: especially, addition of acidifying agent to a stock of silicate, total or partial simultaneous addition of acidifying agent and silicate to a stock of water and silicate.

According to another preferred variant of the invention, the compound (C) is activated carbon.

According to one embodiment of the invention, a mixture of compounds (C), in particular a mixture of precipitated silica and activated carbon, is used.

The compound (C) used in step 1) of the method according to the invention advantageously has a relatively high specific surface area. It generally has, in particular in the case of a precipitated silica and/or activated carbon, a BET specific surface area of at least 100 m²/g, preferably of at least 200 m²/g, in particular greater than 450 m²/g.

The compound (C) usually has a median particle size of at least 0.5 μm, in particular between 0.5 and 100 μm.

When the compound (C) is precipitated silica, this size is preferably more particularly between 0.5 and 50 μm, especially between 0.5 and 20 μm, for example between 2 and 15 μm.

When the compound (C) is activated carbon (in particular coconut activated carbon), this size is preferably more particularly between 1 and 80 μm, especially between 2 and 70 μm.

The compound (C) used in step 1) of the method according to the invention, in particular when it is silica, notably precipitated silica, preferably has a DOP oil uptake of less than 260 ml/100 g, especially of less than 240 ml/100 g, for example of less than 225 ml/100 g. Its DOP oil uptake may be less than 210 ml/100 g, even than 205 ml/100 g. Its DOP oil uptake may be of at least 80 ml/100 g, especially greater than 145 ml/100 g, for example greater than 180 ml/100 g. The DOP oil uptake is determined according to the standard ISO 787/5 using dioctyl phthalate (the measurement is carried out on the compound (C) as is).

The compound (C) used, in particular when it is silica, especially precipitated silica, and/or activated carbon, generally has a CTAB specific surface area (external surface area determined according to the standard NF T 45007 (November 1987)) greater than 280 m²/g, especially greater than 300 m²/g, in particular greater than 330 m²/g, for example greater than 350 m²/g; it may be less than 450 m²/g.

In step 1) of the method according to the present invention, a particular precipitated silica may especially be used having:
- a DOP oil uptake of less than 260 ml/100 g, especially less than 240 ml/100 g, in particular less than 225 ml/100 g;
- a pore volume ($V_{d25}$), formed from pores of diameter less than 25 nm, greater than 0.8 ml/g, especially greater than 0.9 ml/g, for example of at least 0.95 ml/g (pore volume determined by the method of Barett, Joyner and Halenda, known as the BJH method, described especially, by F. Rouquerol, L. Luciani, P. Llewwellyn, R. Denoyel and J. Rouquerol, in "Les Techniques de l'Ingénieur", September 2001);
- a CTAB specific surface area greater than 280 m²/g, especially greater than 300 m²/g, in particular greater than 330 m²/g, for example greater than 350 m²/g;
- preferably, a BET specific surface area greater than 450 m²/g, for example greater than 510 m²/g.

This particular precipitated silica may have a pore diameter ($d_p$), for pores of diameter less than 25 nm, taken at the maximum of the pore size distribution by volume, of less than 12 nm, in particular of less than 8 nm (method of Barett, Joyner and Halenda).

It may be prepared by a method comprising the reaction of a silicate with an acidifying agent, from which a suspension of precipitated silica is obtained, then separating and drying (especially by spraydrying) this suspension, the reaction of the silicate with the acidifying agent being carried out according to the following successive steps:
(i) an initial stock is formed comprising one part of the total quantity of silicate involved in the reaction, the concentration of silicate (expressed as $SiO_2$) in said initial stock being between 10 and 50 g/l, preferably between 12 and 48 g/l, in particular between 15 and 45 g/l, and the temperature of said initial stock being between 40 and 65° C.;

(i') optionally, the acidifying agent is added to said stock, over 5 to 30 minutes, until a pH value of the reaction medium of between 3.5 and 8.5 is obtained;

(ii) the acidifying agent and the remaining quantity of silicate are added, preferably simultaneously, to said stock, over 20 to 150 minutes, the quantity of silicate added (expressed as $SiO_2$)/quantity of silicate present in the initial stock (expressed as $SiO_2$) ratio being greater than 5:
a) either at constant flow rates resulting, at the end of this simultaneous addition, in a pH value of the reaction medium of between 3.5 and 8.5,
b) or at an acidifying agent flow rate adjusted so as to maintain the pH of the reaction medium at a constant value and between 3.5 and 8.5;

(iii) the acidifying agent is added to the reaction medium, in the case where the pH value of the reaction medium at the end of step (ii) is greater than 6.0, over 3 to 25 minutes, so as to achieve a pH value of the reaction medium of between 3.5 and 6.0; and (iv) the reaction medium, obtained at the end of the preceding step, is maintained with stirring over 5 to 60 minutes.

The surface of the particles of the compound (C) used, in particular when it is a precipitated silica, may first be functionalized, especially by grafting or adsorption of organic molecules, comprising for example at least one amino, phenyl, alkyl, cyano, nitrile, alkoxy, hydroxyl, amide, thio and/or halogen function.

According to one variant of the method of the invention, the compound (C) and the polymer (P) solution may be mixed together in the extruder itself, especially under the effect of the movement of the screw or screws that the extruder is generally equipped with.

According to another variant of the method of the invention, the compound (C) and the polymer (P) solution are introduced (step 1)) into the extruder in the form of a previously prepared mixture.

Said mixture is then advantageously obtained (step 0)) by mixing (addition) of at least one compound (C) with (into) at least one polymer (P) solution, preferably with stirring. In particular, it is carried out by addition of the compound (C) into the polymer (P) solution gradually so as to obtain the most homogeneous mixture possible. This preferred prior step amounts to dispersing the compound (C) (in solid form) in a medium formed by the polymer (P) in solution in one of its solvents. Advantageously, the mixture obtained and to be used in step 1) of the method according to the invention is in the form of a homogeneous paste. A rotary mixer equipped with blades or pins may possibly be used here, for example of the Rotolab Zanchetta type, or, preferably, a moderate shear rate rotary ploughshare mixer, especially a mixer of Lödige type. The mixing may be performed at room temperature (temperature of the installation location).

The following may, for example, be used as solvents for the polymer (P) solution: acetic acid (in particular when the polymer (P) is cellulose acetate), water (in particular in the case where the polymer (P) is cellulose sulphate, a polyvinyl alcohol or gum arabic), a naphthenic oil (in particular in the case where the polymer (P) is polyethylene).

When the polymer (P) is cellulose acetate, it is generally dissolved in an acetic acid and water mixture, for example in the following weight proportions:
cellulose acetate: 10 to 25%,
acetic acid: 65 to 80%,
water: 3 to 15%.

An addition of solvent (for example of acetic acid in the case where the polymer (P) is cellulose acetate) may be made into the mixture formed prior to step 1), or into the polymer (P) solution, especially to decrease the viscosity thereof.

The proportions of polymer (P) and compound (C) used in step 1) (or in the prior mixing step) depend on the proportions desired in the final composite material, and are, in general, such that the composite material has a polymer (P) content between 10 and 95%, preferably between 15 and 45%, by weight, and a compound (C) content between 5 and 90%, preferably between 55 and 85%, by weight.

Preferably, the extruder used in step 1) is a twin-screw extruder (in particular a co-rotating twin-screw extruder), for example an extruder of the Clextral BC21 type. The working pressure of the extruder is then generally between 10 and 40 bar, for example between 20 and 30 bar.

The extruder used in step 1) is equipped at its outlet with a plate perforated with one or, preferably, several hole(s) (especially between 1 and 200 holes, in particular between 20 and 200 holes, for example between 30 and 180 holes). The diameter of said orifices may be between 0.1 and 2 mm, in particular between 0.2 and 1 mm, for example between 0.3 and 0.5 mm.

Even if that only constitutes one unpreferred variant of the method of the invention, it is possible to replace the extruder used in step 1) by any means (for example piston inside a chamber) that makes it possible to push the mixture obtained from the compound (C) and from the polymer (P) solution through the hole or holes.

The plate perforated with hole(s) is located between the extruder and blades (cutting blades or knives). These blades in general equip a granulator. There may be, for example, between 2 and 10, especially between 4 and 7, blades. These blades are advantageously rotating blades (rotating cutting blades or knives), their speed of rotation possibly being, for example, between 2000 and 7500 rpm, in particular between 3000 and 5000 rpm.

Put under pressure inside the extruder, in general by the screw or screws contained in the extruder, the material introduced into the extruder is pushed towards the outlet of the extruder and forced to pass through the hole(s) of the perforated plate.

The outlet of the extruder (equipped with the plate perforated with hole(s)) opens into a bath comprising a liquid that is not a solvent for the polymer (P) and that is at least partly (preferably totally) miscible with the solvent used in the polymer (P) solution. The outlet of the extruder (equipped with the plate perforated with hole(s)) may be submerged in this bath.

The blades (cutting blades or knives, these blades/knives preferably being rotating blades/knives) are submerged in the bath. These blades are intended to pass very close to the hole or holes of the perforated plate in order to cut the material coming from the outlet of the extruder and passing through the hole(s) of the perforated plate.

The following may, for example, be used as the liquid that is not a solvent for the polymer (P): water (in particular when the polymer (P) is cellulose acetate and the solvent used is acetic acid), a (dilute) aqueous solution of acetic acid (in particular when the polymer (P) is cellulose acetate and the solvent used is acetic acid), ethanol (in particular in the case where the polymer (P) is cellulose sulphate and the solvent used is water), a carboxylic acid (in particular in the case where the polymer (P) is a polyvinyl alcohol and the solvent used is water), an alcohol (in particular in the case where the polymer (P) is gum arabic and the solvent used is (hot) water)), hexane (in particular in the case where the polymer (P) is polyethylene and the solvent used is a naphthenic oil).

In general, water is used as the liquid that is not a solvent for the polymer (P).

In step 2) of the method according to the invention, after passing into the hole(s) of the perforated plate due to the pressure exerted inside the extruder, the effluent (or extrudate) coming from the outlet of the extruder is cut by the blades (or knives) in the form of drops (portions or segments of effluent (or of extrudate)), said drops precipitating in the bath to particles or elements (in particular granules) of composite material.

The liquid that is not a solvent for the polymer (P) may optionally be added to said bath during step 2).

The bath preferably consists of a stream or flow of liquid that is not a solvent for the polymer (P) and that is at least partly (preferably totally) miscible with the solvent used in the polymer (P) solution. The speed of the stream (or flow) may be, for example, between 5 and 20 L/min, especially between 8 and 15 L/min, in particular for a throughput (of the effluent) exiting the extruder of 100 to 300 g/min, for example of 200 g/min.

The bath comprising the liquid that is not a solvent for the polymer (P) is in general preheated.

Thus, preferably, during the preparation method according to the invention, in particular during step 2), the temperature of the bath comprising the liquid that is not a solvent for the polymer (P), especially when the polymer (P) is cellulose acetate and said liquid is water, is between 25 and 80° C., in particular between 45 and 70° C., for example between 55 and 65° C.

In step 2), in addition to cutting the effluent (or extrudate (s)) coming from the extruder, the polymer (P) is made insoluble (precipitated). Thus, in step 2), the term precipitation is generally understood to mean the insolubilization of the polymer (P) in a liquid which is not a solvent for said polymer (P) and which is at least partly (preferably totally) miscible with the solvent used in the polymer (P) solution used in step 1), the insolubilization of the polymer (P) converting it to a porous solid matrix in which the compound (C) is dispersed.

The products formed at the end of step 2) (or granules of composite material) are then separated from the bath (step 3)), by any known means of separation or of recovery. They are, for example, recovered by means of a filter bag.

In step 4) the composite material recovered is then washed (one or more washing step(s)), in order to at least partly, preferably totally, remove the residual solvent. This washing may be carried out with water (for example by immersing in water for several hours), especially in the case where the solvent used for the polymer (P) is acetic acid.

Then, after a possible step of (preferably light) wiping, the method according to the invention comprises a step 5) of drying, especially in order to remove the washing liquid used in step 4).

Especially when the washing liquid is water, and in particular when the polymer (P) is cellulose acetate, the drying step may be carried out at a temperature between 40 and 110° C., for example in a ventilated device (especially an oven or fluid bed), in general for 2 to 60 hours, in particular between 4 and 30 hours.

The method according to the invention may take place in batch mode or, preferably, continuously, in particular in its steps 1) and 2).

The method according to the invention notably presents the interest of only comprising a reduced number of steps, especially compared to conventional methods for preparing granules. Thus, advantageously, just after passing into the hole(s) of the perforated plate, the extrudate is cut directly by the blades at the outlet of the extruder, opening (especially by immersion) into a liquid, into granules having the desired size, these granules curing directly without sticking together, while then only requiring washing and drying steps. No calibration, screening and/or milling step is thus absolutely necessary.

The method according to the invention makes it possible, advantageously, to prepare a composite material having a filterability at least as high, in general higher, than that of the compound (C) used, in particular when the compound (C) is activated carbon and/or especially silica (preferably precipitated silica). This may be even more the case when the polymer (P) used is cellulose acetate.

Similarly, in a preferred manner, the method according to the invention makes it possible to obtain a composite material that retains a substantial part of the specific surface area of the compound (C) used, in particular when the polymer (P) is cellulose acetate, especially in the case where the compound (C) is activated carbon and/or especially silica (preferably precipitated silica).

The composite material according to the invention or (capable of being) obtained by the method of the invention may be used notably as a liquid support.

As the liquid, mention may be made especially of organic liquids such as organic acids, surfactants, organic additives for rubbers/polymers, and pesticides.

The following may be used as the liquid: preservatives (phosphoric acid and propionic acid especially), aromas, colorants, liquid food supplements, especially for animal feed (in particular, vitamins (vitamin E for example) and choline chloride).

The composite material according to the invention or (capable of being) obtained by the method of the invention may be used as a catalyst support.

It may also be used as an additive, in particular for bulk or thin film materials. It may be used as an additive for paper, paint, or for preparing battery separators.

The composite material according to the invention or (capable of being) obtained by the method of the invention may be used for liquid filtration (for example for filtering beer) or for gas filtration, especially in chromatography.

It has a particularly beneficial application in cigarette filters. It may be, for example, introduced into a cavity filter or dispersed within the network of fibres making up one of the segments of the filter. It has, advantageously, a good absorbability for the volatile and semi-volatile components of cigarette smoke. Its filterability is preferably close to, even greater than, that of the compound (C) alone. Its characteristics allow a reasonable increase in the pressure drop across the filter and a lower entrainment of fine particles in the smoke than in the case of traditional additives, such as activated carbon and silica, when the cigarette is smoked.

Another subject of the present invention is a cigarette filter containing at least one composite material according to the invention or (capable of being) obtained by the method of the invention; said composite material may comprise at least two different compounds (C), for example precipitated silica and activated carbon.

Thus, a composite material containing several compounds (C) of different types may advantageously be introduced into the same filter, using conventional technologies, as if it were a single additive. The invention may therefore make it possible, in addition, to provide an advantage in terms of cost and variety of filters.

The following examples illustrate the invention without however limiting the scope thereof.

EXAMPLES 1-4

In Examples 1 to 3, as compound (C), a precipitated silica in powder form is used as the starting material, having the following characteristics:

| | |
|---|---|
| BET specific surface area: | 550 m$^2$/g |
| oil uptake (DOP): | 200 ml/100 g |
| median particle size: | 23 µm |
| moisture (ISO 787/2 standard, 105° C., 2 h): | 7% |

In Examples 1 to 3, as polymer (P), cellulose acetate in solution in acetic acid (cellulose acetate solution) is used as the starting material. More specifically, the cellulose acetate solution used contains 18% of cellulose acetate, 11% of water and 71% of acetic acid (% by weight).

EXAMPLE 1 (ACCORDING TO THE INVENTION)

Firstly, a mixture was prepared by adding 1390 g of precipitated silica to 3000 g of cellulose acetate solution.

In order to do this, the precipitated silica was added gradually to the cellulose acetate solution, this addition being carried out with stirring (stirrer motor equipped with a frame paddle), so as to obtain a homogeneous mixture; the product obtained was placed in the bowl of a Rotolab Zanchetta granulator, in which it was subjected to stirring (rotor speed: 500 rpm) at room temperature for 5 minutes.

Then the mixture obtained was introduced into the cylinder of a piston press operated hydraulically, the outlet of the piston press being connected to the inlet of a co-rotating twin screw extruder (Clextral BC21). The outlet of the extruder used was equipped with a plate perforated with 36 orifices, the diameter of said holes being 0.5 mm.

This plate perforated with 36 holes was located between the extruder and seven cutting blades of a granulator. These cutting blades were mounted on a rotating disk, rotating with 4950 rpm in direct contact with the perforated plate in order to cut the mixture passing through the orifices. The knives were submerged in a stream of water enclosed by a tube. The said stream of water was held at a constant temperature of 60° C. and was maintained by pumping the water in cycle from a reservoir with a volume of 150 L into a tube passing by the said rotating knives, then through a filter bag and back into the reservoir.

Put under pressure inside the piston press, the mixture of precipitated silica and cellulose acetate solution is pushed towards the outlet of the hydraulic press and forced into the extruder. The said mixture is then further put under pressure inside the extruder up to 20 bar, the extruder being operated at 80 rpm, and thus forced to pass through the orifices of the perforated plate.

The effluent (or extrudate) coming from the extruder through these holes of the perforated plate was cut by the knives mounted on the rotating disk in the form of drops, said drops precipitating, in the stream of water, to granules. The stream of water was adjusted such that said granules were carried by this stream into the filter bag. The mesh size of the filter bag was smaller than the resulting granules, ensuring an effective separation of the granules from the circulating stream of water.

The granules were then recovered from the filter bag and washed with water for 24 hours in order to remove the residual acetic acid.

After a light wiping, the granules were dried in a ventilated oven for 24 hours at a temperature of 80° C.

The characteristics of the composite material thus obtained (CM1) are given in Table 1.

EXAMPLE 2 (ACCORDING TO THE INVENTION)

Here the precipitated silica and the cellulose acetate solution were mixed together in the extruder itself under the effect of the movement of the screws of the extruder.

In order to do so, the precipitated silica was continuously dosed into the inlet of a co-rotating twin screw extruder (Clextral BC21) by means of a gravimetric feeder (Ktron) at a rate of 1.42 kg per hour and simultaneously the cellulose acetate solution was continuously dosed into the inlet of the extruder by means of a gear type pump at a rate of 3.15 kg per hour.

The co-rotating twin screw extruder was equipped with screws of a total length of 90 cm. On the inlet side of the extruder, the screws were equipped over a length of 50 cm with conveying elements, followed in the middle of the screws over a length of 10 cm by mixing (kneading) elements and followed on the outlet side over a length of 30 cm by conveying elements.

The outlet of the extruder used was equipped with a plate perforated with 36 orifices, the diameter of said holes being 0.5 mm.

This plate perforated with 36 holes was located between the extruder and seven cutting blades of a granulator. These cutting blades were mounted on a rotating disk, rotating with 4950 rpm in direct contact with the perforated plate in order to cut the mixture passing through the orifices. The knives were submerged in a stream of water enclosed by a tube. The said stream of water was held at a constant temperature of 60° C. and was maintained by pumping the water in cycle from a reservoir with a volume of 150 L into a tube passing by the said rotating knives, then through a filter bag and back into the reservoir.

By dosing the precipitated silica and the cellulose acetate solution into the inlet of the extruder, which was operated at 80 rpm, the materials were transported to the mixing (kneading) elements. The resulting mixture was further transported towards the outlet of the extruder and put under pressure up to 20 bar by the conveying elements and forced to pass through the orifices of the perforated plate.

The effluent (or extrudate) coming from the extruder through these holes of the perforated plate was cut by the knives mounted on the rotating disk in the form of drops, said drops precipitating, in the stream of water, to granules. The stream of water was adjusted such that said granules were carried by this steam into the filter bag. The mesh size of the filter bag was smaller than the resulting granules, ensuring an effective separation of the granules from the circulating stream of water.

The granules of composite material were then recovered from the filter bag and washed with water for 24 hours in order to remove the residual acetic acid.

After a light wiping, the granules were dried in a ventilated oven for 24 hours at a temperature of 80° C.

The characteristics of the composite material thus obtained (CM2) are given in Table 1.

EXAMPLE 3 (COMPARATIVE EXAMPLE)

Firstly, a mixture was prepared by adding 139 g of precipitated silica to 300 g of cellulose acetate solution.

In order to do this, the precipitated silica was added gradually to the cellulose acetate solution, this addition being carried out with stirring (stirrer motor equipped with a frame paddle), so as to obtain a homogeneous mixture; the product obtained was placed in the bowl of a Rotolab Zanchetta granulator, in which it was subjected to stirring (rotor speed: 500 rpm) at room temperature for 5 minutes.

Then the mixture obtained was introduced into the cylindrical screen of a Fuji Paudal extruder, the screen being pierced with 500 μm diameter orifices, and the extrusion was carried out by rotating the rotor that pushes the mixture through the screen, thus generating 500 μm diameter cylindrical extrudates. The application of an airstream made it possible to limit bonding between several cylindrical extrudates.

The extrudates obtained were then poured into water that had been preheated to 60° C., in which they were left for 15 minutes, the water being subjected to stirring.

After having removed them from the water, the extrudates were washed 5 times with cold water (duration of each wash: 15 minutes) in order to remove the residual acetic acid.

After a light wiping, the extrudates were dried in a ventilated oven for 12 hours at a temperature of 95° C.

The characteristics of the composite material thus obtained (reference CCM) are given in Table 1.

TABLE 1

|  | CM1 | CM2 | CMM |
| --- | --- | --- | --- |
| Median particle size (μm) | 583 | 595 | 715 |
| Vd1 (cm$^3$/g) | 0.94 | 1.01 | 0.55 |
| Cohesion index $CI_N$ * | 0.91 | 0.89 | 0.02 |
| Average pore diameter (nm) | 16.2 | 14.1 | 11.7 |
| BET surface area (m$^2$/g) | 287 | 290 | 380 |
| Silica content (%) | 70 | 70 | 70 |
| Cellulose acetate content (%) | 30 | 30 | 30 |

* measured by the cohesion test mentioned in the description

In particular, it can be seen that the composite materials according to the invention (CM1, CM2) have a higher cohesion than the comparative composite material (CMM) and than activated carbon alone (for which the cohesion index $CI_N$ is equal to 0.11).

EXAMPLE 4

In order to evaluate their properties for adsorbing volatile and semi-volatile compounds in a stream of cigarette smoke, the composite materials obtained in Examples 1 and 2 were used in cigarette samples made from the tobacco part of standard Coresta Monitor No. 4 samples with which a manually mounted cavity filter is associated.

This filter is made from an 8 mm long cellulose acetate segment, a cavity completely filled (without dead volume) with the additive to be tested and from another 8 mm long cellulose acetate segment. The additive to be tested is made either from one of the composite materials from Examples 1 and 2, or from silica alone or from activated carbon alone (corresponding to those used as the starting material in the above examples) by way of reference; in these last two cases, the quantity of silica or of carbon used in the filter is equal to the quantity of silica present in the filter containing the composite material from Example 1 or 2. The length of the cavity containing the additive is about 9 mm.

After manually mounting the filter, each cigarette sample was conditioned for 90 hours at 60% relative humidity and at a temperature of 22° C., then smoked in a Borgwaldt (RM20H) 20 position rotary smoking machine.

The smoke exiting the filter passes into a "Cambridge" filter that only allows the vapour phase to pass, this then being recovered by cold traps filled with methanol.

The volatile and semi-volatile compounds thus recovered were analysed by gas chromatography-mass spectrometry (GC-MS).

The degrees of reduction of the volatile and semi-volatile species indicated in Table 2 below were determined in relation to those obtained with cigarettes of the same type, but for which a 9 mm long cavity was left empty between the two cellulose acetate segments.

TABLE 2

|  | CM1 | CM2 | Silica | Activated carbon |
|---|---|---|---|---|
| Silica content (%) | 70 | 70 | 100 | — |
| Activated carbon content (%) | — | — | — | 100 |
| Quantity used (mg) | 107 | 107 | 75 | 75 |
| | Degree of reduction (%) | | | |
| Pyridine | 81 | 80 | 75 | 55 |
| Crotonaldehyde | 44 | 45 | 34 | 71 |
| Acrolein | 53 | 55 | 52 | 69 |
| Acetone | 66 | 66 | 64 | 68 |
| Acetonitrile | 58 | 60 | 52 | 61 |

It can be seen that the composite materials according to the invention (CM1, CM2) have very satisfactory adsorption properties. They make it possible to obtain degrees of reduction of the volatile and semi-volatile species greater than those obtained with silica alone and overall equivalent to those obtained with activated carbon alone, while having a much better cohesion.

The invention claimed is:

1. A composite material comprising at least one polymer (P), wherein said at least one polymer (P) comprises cellulose acetate, and at least one compound (C), wherein said at least one compound (C) is selected from the group consisting of precipitated silica and a mixture of precipitated silica and activated carbon, and said composite material has:
 a number median particle size of at least 150 μm;
 a pore volume (Vd1), constituted of pores of diameter ranging from 3.6 to 1000 nm, of at least 0.4 cm$^3$/g; and
 a cohesion index $CI_N$, equal to the ratio (number median particle size after an air pressure stress of 4 bar)/(number median particle size without air pressure stress (0 bar)), greater than 0.40.

2. The composite material as defined by claim 1, wherein said at least one compound (C) comprises precipitated silica.

3. The composite material as defined by claim 1, wherein said at least one compound (C) comprises a mixture of precipitated silica and activated carbon.

4. The composite material as defined by claim 1, having a number median particle size of at least 250 μm.

5. The composite material as defined by claim 1, having a pore volume (Vd1), constituted of pores of diameter from 3.6 to 1000 nm, of at least 0.5 cm$^3$/g.

6. The composite material as defined by claim 1, having a cohesion such that its cohesion index $CI_N$ is greater than 0.50.

7. The composite material as defined by claim 1, having a number median particle size after an air pressure stress of 4 bar of greater than 350 μm.

8. The composite material as defined by claim 1, having an average pore diameter, for pores of diameter ranging from 3.6 to 1000 nm, of at least 9 nm.

9. The composite material as defined by claim 1, having a BET specific surface area of at least 50 m$^2$/g.

10. The composite material as defined by claim 1, having a median particle size of at least 400 μm, a BET specific surface area of at least 200 m$^2$/g, and a cohesion index $CI_N$, equal to the ratio (number median particle size after an air pressure stress of 4 bar)/(number median particle size without air pressure stress (0 bar)), greater than 0.60.

11. The composite material as defined by claim 1, having a polymer (P) content ranging from 10% to 95% by weight and a compound (C) content ranging from 5% to 90%.

12. The composite material as defined by claim 1, in cylindrical form, in spherical form or in the form of granules.

13. The composite materials as defined by claim 1, further comprising at least one aroma and/or at least one plasticizer.

14. A method for preparing the composite material as defined by claim 1, the method comprising the following successive steps:
 1) introducing at least one compound (C), selected from among the mineral oxides, aluminosilicates and activated carbon, and at least one polymer (P) solution, into an extruder, the outlet of the extruder being equipped with a plate perforated with hole(s), said plate being located from the extruder and blades, the outlet of the extruder opening into a bath comprising a liquid that is not a solvent for the at least one polymer (P) and being at least partly miscible with the solvent comprising the polymer (P) solution, said blades being submerged in the bath;
 2) after passing into the hole(s) of the plate, the effluent emanating from the outlet of the extruder is cut by said blades, in the form of drops, said drops precipitating in said bath into particles, optionally granules of composite material;
 3) separating said particles from said bath;
 4) washing said particles to eliminate, at least partially, the solvent comprising the polymer (P) solution; and
 5) drying said particles.

15. The method as defined by claim 14, wherein the at least one compound (C) and the at least one polymer (P) solution are introduced into the extruder in the form of a previously prepared mixture.

16. The method as defined by claim 14, wherein said liquid that is not a solvent for the at least one polymer (P) comprises water.

17. The method as defined by claim 14, wherein the cellulose acetate solution employed in step 1) comprises acetic acid solvent.

18. The method as defined by claim 14, wherein the liquid, which is not a solvent for cellulose acetate, comprises water or a water and acetic acid mixture.

19. The method as defined by claim 14, wherein said at least one compound (C) comprises precipitated silica.

20. The method as defined by claim 14, wherein said at least one compound (C) comprises a mixture of precipitated silica and activated carbon.

21. The method as defined by claim 14, wherein said at least one compound (C) has a BET specific surface area of at least 100 m²/g.

22. The method as defined by claim 14, wherein the extruder comprises a twin-screw extruder.

23. The method as defined by claim 14, wherein the temperature of the bath comprising the liquid that is not a solvent for the polymer (P) ranges from 25° C. to 80° C.

24. The method as defined by claim 14, wherein said blades are rotating blades.

25. A liquid support, solid support, additive or for liquid or gas filtration, comprising a composite material as defined by claim 1, or produced by the method according to claim 14.

26. A cigarette filter comprising a composite material as defined by claim 1.

27. The cigarette filter as defined by claim 26, said composite material comprising precipitated silica and activated carbon.

28. A cigarette filter comprising a composite material produced by the method according to claim 14.

29. The cigarette filter as defined by claim 28, said composite material comprising precipitated silica and activated carbon.

* * * * *